Sept. 15, 1953      H. P. OLSON      2,651,877
WEEDLESS HOOK AND LURE
Filed Oct. 13, 1950
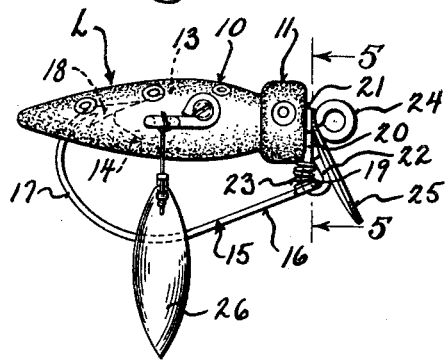
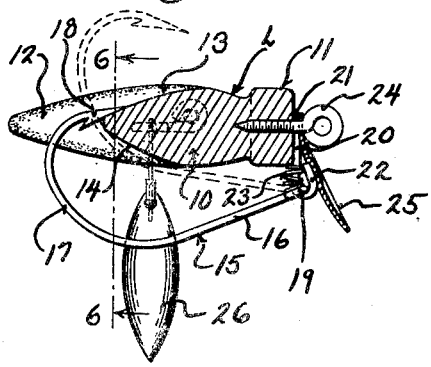
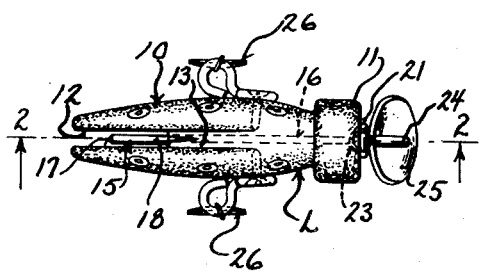
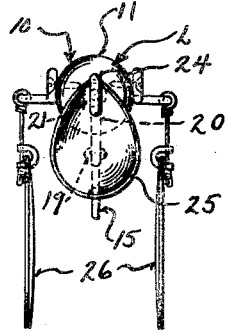
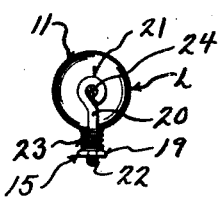
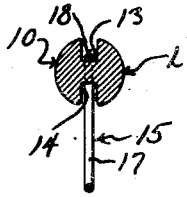
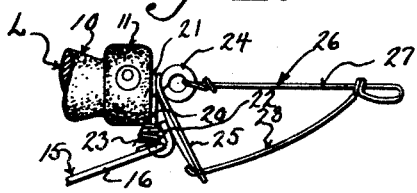
INVENTOR
HANS P. OLSON
BY
ATTORNEYS Patented Sept. 15, 1953

2,651,877

UNITED STATES PATENT OFFICE 2,651,877

WEEDLESS HOOK AND LURE

Hans P. Olson, Racine, Wis.

Application October 13, 1950, Serial No. 189,941

1 Claim. (Cl. 43—42.41)

This invention appertains to fishing and more particularly to a novel fishing bait, plug or lure.

One of the primary objects of my invention is to provide a weedless lure, in which the spring for the hook is so-positioned, that the same can be quickly and economically assembled, with the hook and the body of the lure, and be entirely out of the way, so that the same will not catch in any obstructions, weeds or the like.

Another salient object of my invention is the provision of a novelly shaped body for receiving the hook, the body being provided with an upper groove or way for housing the barb of the hook when the hook is being used for fishing, and a lower way or groove for receiving the shank of the hook, when a fish strikes the lure, so that the barb and the bight portion of the hook will be effectively uncovered to permit the full embedding of the hook in the mouth of a fish.

A further important object of the invention is the provision of a guard plate carried by the front of the body of the lure, which not only functions to give the lure a desired motion in the water, but which also functions as a protection for the spring of the hook and the front of the eye which carries the hook.

With these and other objects in view, the invention consists in the novel construction, arrangement and formation of parts, as will be hereinafter more specifically described and claimed, and illustrated in the accompanying drawing, in which drawing, Figure 1 is a side elevational view of a lure constructed in accordance with my invention.

Figure 2 is a central longitudinal sectional view through the lure, taken on the line 2—2 of Figure 3, looking in the direction of the arrows.

Figure 3 is a top plan view of the lure.

Figure 4 is a front elevational view of the lure.

Figure 5 is a transverse sectional view through the lure, taken on the line 5—5 of Figure 1, looking in the direction of the arrows, only the parts immediately adjacent the section line being shown.

Figure 6 is a transverse sectional view through the lure taken on the line 6—6 of Figure 2, looking in the direction of the arrows.

Figure 7 is a fragmentary side elevational view of my bait showing a front weed guard associated therewith.

Referring to the drawing in detail, wherein similar reference characters designate corresponding parts throughout the several views, the letter L generally indicates my improved lure and the same can be shaped and constructed to simulate a live object, such as a grasshopper. The lure L includes an elongated body 10, formed from any desired material, such as wood, plastic or the like, painted and ornamented in any desired manner. The body 10 includes a head 11 at its forward end and the body can gradually taper toward its rear end. In accordance with my invention, the body 10, at its rear end, is provided with a longitudinally extending slot 12, which opens out through the upper and lower faces and rear end of the body to simulate legs or wings, and the upper face of the body is provided with a longitudinally extending downwardly and rearwardly inclined groove 13, which communicates with the slot 12. The lower face of the body is provided with a similar upwardly and rearwardly inclined groove 14, which communicates with the slot 12.

A hook 15 is utilized with the body and the same includes the customary shank 16, the curved bight portion 17 and a barb 18. The forward end of the shank is provided with an eye 19. The hook is pivotally mounted at the forward end of the body by means of a depending bracket 20 and the upper end of the bracket is provided with a fastening eye 21. The lower end of the bracket is provided with a loop 22. The eye 19 of the hook 15, receives the loop 22 whereby the hook can swing on the bracket, and as clearly shown in Figure 2, the barb 18 of the hook 15, is received in the groove 13. In order to yieldingly hold the hook in the full line position shown in Figure 2, an expansion spring 23 is placed on the bracket 20 above the eye 19 of the hook 15, and consequently this spring 23 normally bears down on the hook to hold the barb 18 in the groove 13, and against the bottom wall thereof. A screw eye 24 is employed for securing the bracket 20 to the head, and this passes through the eye 21 of the bracket 20. This screw eye is threaded centrally into the head 11 and forms means whereby the lure can be attached to a fish line.

Great stress is laid on the fact, that the spring 23 is a coil spring is provided and that this spring is mounted on the bracket 20, in that displacement of the spring is prevented, and the same forms little or no obstruction to the lure. When a fish strikes the lure, the hook will assume the dotted line position shown in Figure 2, and the shank 16 and a part of the bight 17 of the hook will ride into the groove 13 and consequently the barb and the major portion of the bight 17 will be uncovered, so that the proper embedding of the barb in the fish's mouth will take place.

The slot 12 forms an efficient guide for the hook during its swinging movement.

If preferred, a dished plate 25 of shiny material can be used at the front of the lure and this plate is attached to the body by the screw eye 24 passing therethrough. Attention is called to the fact that the plate 25 is positioned directly in front of the bracket 20 and forms an efficient guard therefor and for the spring 23. This forms an important feature of the invention. Obviously, the plate 25 will also impart a desired motion to the lure.

The lure can be provided with other suitable appendages, such as side spoons 26.

As shown in Figure 7, a front weed guard 26 can be provided for the bait or lure L. As illustrated, this weed guard 26 can include a straight pull rod 27 and a depending arcuate resilient leg 28. The rod 27 is secured to the screw eye 24 and the leg 28 can be connected to the plate 25. The weed guard can be formed from a single strand of light wire, if such should be desired and the curved leg 28 functions to guide the bait or lure over weeds.

From the foregoing description, it can be seen that I have provided an exceptionally simple and effective lure, in which all parts are thoroughly protected and guarded.

Changes in details may be made without departing from the spirit or the scope of this invention, but what I claim as new is:

A fish lure comprising an elongated body, and a hook including a shank, an eye, a bight portion and a barb, a screw eye threaded into the extreme forward end of said body, a depending bracket on the forward end of the body having its upper end secured to said screw eye and having a depending loop on its lower end receiving the eye of the hook, an expansion spring coiled about said bracket and confined between the body and the eye of the hook for normally holding the hook in a lowered position with the barb engaging a part of the body, and a guard plate secured on the forward end of the body by said screw eye, said screw eye having its shank passing through the said bracket and said guard plate and into said body and said guard plate being disposed directly in front of the bracket and spring and against said bracket.

HANS P. OLSON.

References Cited in the file of this patent
UNITED STATES PATENTS

| Number    | Name       | Date           |
|-----------|------------|----------------|
| 1,537,266 | Ryan       | May 12, 1925   |
| 1,808,565 | McLaughlin | June 2, 1931   |
| 2,215,908 | Lauby      | Sept. 24, 1940 |
| 2,456,705 | Herring    | Dec. 21, 1948  |
| 2,558,121 | Bailey     | June 26, 1951  |